United States Patent
Huang et al.

(10) Patent No.: US 6,620,462 B1
(45) Date of Patent: Sep. 16, 2003

(54) METHOD TO PREVENT BACKSIDE TIN CROSS CONTAMINATION FOR REFLECTIVE PRODUCT

(75) Inventors: Ya-Chien Huang, Keelung (TW); Bao-Ru Young, I-Lan (TW); Shin-Shiung Chen, Hsin-Chu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 10/154,286

(22) Filed: May 23, 2002

(51) Int. Cl.$^7$ ............... B05D 1/36; B05D 5/12
(52) U.S. Cl. ............ 427/419.7; 427/58; 427/402; 427/419.1; 427/419.2; 427/407.1
(58) Field of Search .............. 427/58, 402, 407.1, 427/419.1, 419.2, 419.7

(56) References Cited

U.S. PATENT DOCUMENTS

| | | | |
|---|---|---|---|
| 4,511,756 A | * | 4/1985 | Moeller et al. ............ 136/258 |
| 5,731,243 A | | 3/1998 | Peng et al. ................ 438/612 |
| 6,010,923 A | | 1/2000 | Jinno ........................ 438/158 |
| 6,171,883 B1 | | 1/2001 | Fan et al. .................. 438/65 |
| 2002/0197761 A1 | * | 12/2002 | Patel et al. ............... 438/523 |

* cited by examiner

Primary Examiner—Michael Barr
(74) Attorney, Agent, or Firm—George O. Saile; Stephen B. Ackerman

(57) ABSTRACT

A new method is provided for the creation of a protective layer over a glass substrate, the glass substrate has a first and a second surface. Under a first embodiment of the invention, a second surface of the glass panel is first coated with a layer of TiN. A first layer of amorphous silicon (A—Si) is deposited over the second surface of the glass panel. A second layer of amorphous silicon (A—Si) is deposited over the layer of TiN. A layer of photoresist is next deposited over the surface of the second layer of A—Si. The first layer of A—Si is removed from the second surface of the glass panel after which the layer of photoresist is removed. Under a second embodiment of the invention, the first and the second surface of the glass panel are coated with a first and a second layer of TiN. A layer of amorphous silicon (A—Si) is deposited over the second layer of TiN. A layer of photoresist is deposited over the layer of A—Si. The first layer of TiN on the first surface of the glass panel is removed after which the layer of photoresist is removed.

14 Claims, 3 Drawing Sheets

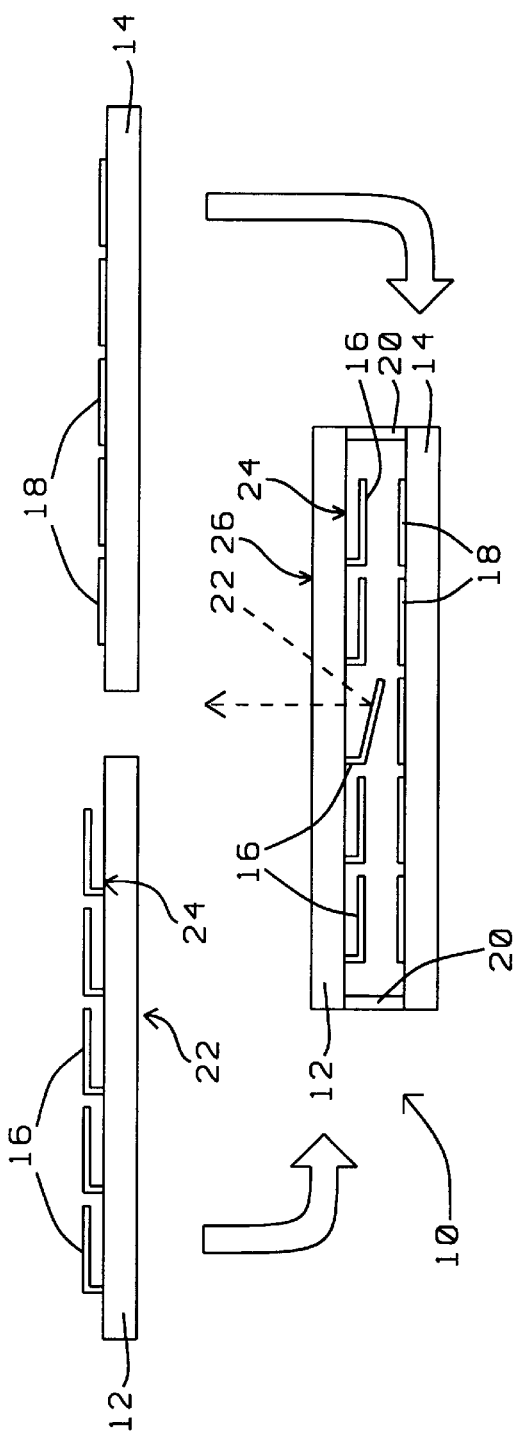
FIG. 1 - Prior Art
FIG. 2a
FIG. 2b

METHOD TO PREVENT BACKSIDE TIN CROSS CONTAMINATION FOR REFLECTIVE PRODUCT

BACKGROUND OF THE INVENTION (1) Field of the Invention

The invention relates to the fabrication of integrated circuit devices, and more particularly, to a method to prevent backside TiN contamination for reflective product in which a layer of TiN is applied as backside material.

(2) Description of the Prior Art

Conventional methods of creating complex packages comprising semiconductor devices use semiconductor substrates over the surface of which layers of conductive interconnect traces are created, which are typically separated by layers of dielectric. The art of creating packaged semiconductor devices frequently provides for packaging semiconductor devices that are created with the purpose of processing and/or storing of digital data. Other semiconductor packages are based on packaging semiconductor storage and processing devices in addition to providing the ability to provide processing capability of on optical nature. The latter is frequently combined with processing capabilities, which are incorporated by providing discrete components that are created using semiconductor technology disciplines while resembling the electrical performance characteristics of conventionally used discrete electrical components. Examples of such semiconductor packages are the creation of solar cell based optical electronic devices, image array optical devices including sensor and display image array devices, which further comprise the familiar flat panel display image arrays and the like. These and other devices that are created using semiconductor technology have found wide application in numerous by now familiar consumer products such as the application of sensor array devices being used in digital cameras while display image array devices are frequently used as the basis for visual interface elements for mobile computers.

These new and increasingly more complex devices and device packages require control and mastery of seemingly diverse but in fact closely cooperative technologies and disciplines such as most notably a detailed knowledge of optical properties of materials and the combination of such materials with conventional although rapidly developing semiconductor materials and processing conventions. As an example can be cited the problem of optical stability that is frequently encountered in the creation of image array devices.

One of the materials that is frequently used for the creation of complex semiconductor devices and packages is glass. As an example of the application of glass in the creation of a semiconductor related component can be cited the creation of a half-tone shift mask. For the substrate of a half-tone shift mask most typically is used quartz whereby however glass and sapphire can also be used for this purpose. For half-tone shift masks the conventional shifter material is MoSiON. The standard mask comprises a substrate on the surface of which a patterned layer of opaque material is created. Typically used for the opaque material is chromium that has been deposited over the quartz substrate to a thickness of about 1,000 Angstrom. Alternate opaque materials for the creation of the patterned layer on the surface of a photolithographic mask are nickel and aluminum while for more sophisticated masks such as halftone phase shift masks MoSiON is used as the phase shifter material.

Glass in addition is frequently used as part of a compound layer of material such as creating a passivation layer, which conventionally is created using silicon nitride but may also be created using phosphosilicate glass or a layer of phosphosilicate glass over a layer of silicon oxide. Numerous other examples can be cited in which glass is part of a compound layer of semiconductor material such as the stiffener portion of a carrier substrate, which is typically composed of a fire retardant epoxy-glass cloth laminate, Fluorine doped Silicon dioxide Glass (FSG), boro-phosphate-silicate-glass (BPSG), phospho-silicate-glass (PSG), boro-silicate-glass (BSG) and the like.

The invention addresses concerns that are raised in using a glass panel for the creation of a complex semiconductor package. Glass is subject to scratch during the creation of a semiconductor package, which has a detrimental effect on the performance characteristics of the glass panel. It may for instance be required that light passes through the glass panel in an undistorted manner and without causing undesired optical reflections. It is therefore required that the surfaces of the glass panel are protected, to provide this protection of the glass surface a layer of TiN is typically deposited over the protected surfaces. Processing tools that are used to process the glass substrate after the protective and exposed layer of TiN has been deposited must be thoroughly cleaned in order to prevent contamination by TiN residue in subsequent processing steps for which these tools are applied. This is a time-consuming and therefore expensive operation. The invention provides a method whereby the need for post-processing clean of the TiN processing tool is eliminated.

U.S. Pat. No. 6,010,923 (Jinno) shows a protective layer over the front side of a glass substrate.

U.S. Pat. No. 5,731,243 (Peng et al.) shows a protective layer over the front side of a substrate during a backside grind.

U.S. Pat. No. 6,171,883 (Fan et al.) shows an image array on a glass substrate.

SUMMARY OF THE INVENTION

A principle objective of the invention is to prevent TiN contamination after a surface of a glass panel has been covered with a protective layer of TiN.

In accordance with the objectives of the invention a new method is provided for the creation of a protective layer over a glass surface. The glass panel has a first and a second surface, the first embodiment of the invention provides a protective layer of TiN over the first surface of the glass panel, the second embodiment of the invention provides a protective layer of TiN over the second surface of the glass panel.

Under a first embodiment of the invention, the second surface of the glass panel is first coated with a layer of TiN, which forms the protective layer of semiconductor material. A first layer of amorphous silicon (A—Si) is then deposited over the second surface of the glass panel. A second layer of amorphous silicon (A—Si) is then deposited over the layer of TiN that has been deposited over the first surface of the glass panel. A layer of photoresist is next deposited over the surface of the second layer of A—Si. The first layer of A—Si is removed from the second surface of the glass panel. The layer of photoresist, which has been used for the protection of the second layer of A—Si and the layer of TiN over the first surface of the glass panel, is then removed leaving in place a protective coating of TiN and the second layer of A—Si over the first surface of the glass panel.

Under a second embodiment of the invention, the first and the second surface of the glass panel are first coated with a first and a second layer of TiN respectively of which the second layer of TiN will form the protective layer of semiconductor material. A layer of amorphous silicon (A—Si) is then deposited over the second layer of TiN on the second surface of the glass panel. A layer of photoresist is deposited over the layer of A—Si. The first layer of TiN on the first surface of the glass panel is removed. The layer of photoresist, which has been used for the protection of the layer of A—Si and the second layer of TiN over the second surface of the glass panel, is then removed leaving in place a protective coating of the second layer of TiN and A—Si over the second surface of the glass panel.

From the highlighted processing sequence it is clear that the protective layer of TiN is now covered with a layer of A—Si, thus preventing contamination of processing tools that are used to process the glass panel with the objective of providing a protective layer of TiN over the surface thereof.

BRIEF DESCRIPTION OF THE DRAWINGS

FIG. 1 is a cross section highlighting a conventional application of a substrate.

FIGS. 2a through 2e highlight the first embodiment of the invention, as follows:

FIG. 2a shows a cross section of a glass panel, the second surface of the glass panel has been coated with a layer of TiN.

FIG. 2b shows a cross section of the glass panel after a first layer of amorphous silicon (A—Si) has been deposited over the second surface of the glass panel.

FIG. 2c shows a cross section of the glass panel after a second layer of amorphous silicon (A—Si) has been deposited over the layer of TiN that has been deposited over the first surface of the glass panel.

FIG. 2d shows a cross section of the glass panel after a layer of photoresist has been deposited over the surface of the second layer of A—Si.

FIG. 2e shows a cross section of the glass panel after the first layer of A—Si has been removed from the second surface of the glass panel. The layer of photoresist has been removed, leaving in place a protective coating of TiN and the second layer of A—Si over the first surface of the glass panel.

FIG. 3a shows a cross section of a glass panel after the first and the second surface of the glass panel have been coated with a first and a second layer of TIN respectively.

FIG. 3b shows a cross section of the glass panel after a layer of amorphous silicon (A—Si) has been deposited over the second layer of TiN on the second surface of the glass panel.

FIG. 3c shows a cross section of the glass panel after a layer of photoresist has been deposited over the layer of A—Si.

FIG. 3d shows a cross section of the glass panel after the first layer of TiN has been removed from the first surface of the glass panel. The layer of photoresist has been removed, leaving Lo in place a protective coating of the second layer of TiN and the layer of A—Si over the second surface of the glass panel.

DESCRIPTION OF THE PREFERRED EMBODIMENTS

Figure 2C:
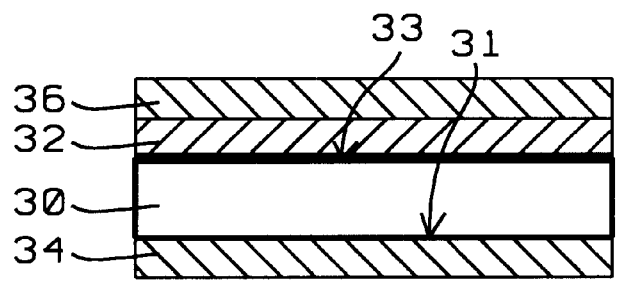

The invention will now be described in detail using FIG. 1, further using FIGS. 2a through 2e for the first embodiment of the invention and using FIGS. 3a through 3d for the second embodiment of the invention.

Referring now specifically to FIG. 1, there is shown a cross section that highlights a conventional application of a glass or substrate in the creation of a semiconductor package. Highlighted in the cross section of FIG. 1 are the following elements of the package:

10, the assembled semiconductor package 12, the or glass panel that forms a first integral part of the assembled semiconductor package 10

14, a CMOS based substrate that forms a second integral part of the assembled semiconductor package 10

16, micro-mirrors that are mounted above the CMOS substrate 14 in positions and under angles with a horizontal direction as required for operational considerations of the assembled package 10

18, electrodes that functionally are part of the CMOS substrate 14 and which have as essential function to interface with light energy as this light energy impinges on a surface of the package; it must be noted that electrodes 18 align with micro-mirrors 16, which provides the electrodes 18 with the ability to functionally interface with the micro-mirrors 16

22, light that impinges on the assembled package 10 and that is processed or reflected by the package as part of the functional requirements of the package 10

20, spacers that separate and position the substrate 12 with respect to the CMOS substrate 14

24, the first surface of the substrate 12, and 26, the second surface of the substrate 12.

It must again be emphasized that it is a basic requirement of the assembled package that, in order to assure proper functional capabilities of the package, the surfaces 24 and 26 of the substrate 12 are optically smooth. From this follows that damage to the surfaces 24 and 26 must be prevented, which is the reason that a protective coating is provided over the second surface of the glass substrate.

The functional performance and requirements that identify the semiconductor package that is shown in cross section in FIG. 1 are not germane to the invention and will therefore not be further highlighted at this time. The cross section of FIG. 1 is provided to illustrate one of the numerous uses that can be made of a substrate (substrate 12 in the cross section of FIG. 1) in order to created a functional package containing semiconductor devices.

With the application of a substrate, this substrate must be provided with the following characteristics so that the substrate can be used in a processing environment that is aimed at creating a complete semiconductor package of which the substrate is an integral part:

1. the exposed surface of the substrate must be protected in order to assure optical smoothness of that surface during and after completion of the assemblage of the package, 2. for processing and reasons of manufacturability, it must be possible to locate the edge of the wafer that is used for, in the example cited in FIG. 1, the edge of the wafer that is used to create the CMOS substrate; this requirement will hence be referred to as the Mechanical Delivery characteristic; a wafer that is used as part of a package that comprises a panel must therefore pass a (Mechanical) Delivery test, and 3. a protective coating that is provided over the exposed surface of the substrate must adhere to the protected surface.

Conventionally, a layer of TiN is used as a protective layer provided over the surface of a substrate. The disadvantage of using TiN for this purpose has previously been highlighted in that the exposed TiN readily escapes in molecular form during subsequent processing, causing a high level of TiN contamination on exposed surfaces of the processing tools.

A number of protective materials have been investigated as replacements for the conventional protective layer of TiN, these material are listed below together with their adhesive qualities and their ability to meet previously highlighted the Mechanical Delivery test.

| Protective Material | Adhesion | Delivery Test |
|---|---|---|
| SiN | poor | N.A. |
| Poly/A-Si | good | no |
| TiN | good | pass |

However, the layer of TiN results in, if this layer is exposed and as previously highlighted, a high level of contamination and is therefore, in its exposed form, not acceptable in a semiconductor manufacturing environment.

With the above indicated results in mind, the invention has selected to provide a protective coating of TiN, which provides good adhesion to the surface of the substrate in addition to meeting the Delivery Test requirement, over which a layer of A—Si is created.

The invention provides two embodiments for the implementation of creating a layer of TiN over which a layer of A—Si is created, these two embodiments will be highlighted next.

The first embodiment of the invention will be highlighted using FIGS. 2a through 2e.

Referring specifically to the cross section that is shown in FIG. 2a, there is shown the cross section of a substrate 30. The substrate 30 has two surfaces, a first (or front) surface 33 and a second (or back) surface 31. A layer 32 of TiN has been deposited over the first surface 33 of the substrate 30.

Layer 32 is not limited to comprising TiN but can comprise, as a layer of said backside material, a material that is selected from the group consisting of titanium nitride and silicon and silicon oxide and tungsten and silicon nitride.

TiN is frequently used as an Anti Reflective Coating (ARC) material since it forms an opaque layer, which is useful as a non-reflective coating when formed over reflecting surfaces, such as the surface of a glass panel. TiN is also frequently used as a barrier layer, layer 32 can preferably be deposited using rf. sputtering, to a thickness between about 500 to 1,000 Angstrom. Layer 32 of TiN can also be deposited using methods of CVD.

Next, see the cross section of FIG. 2b, a first layer 34 of A—Si is blanket deposited over the second surface 31 of the substrate 30. The amorphous silicon film 34 can be formed by introducing a 100% $SiH_4$ gas having a flow rate of 1,000 sccm and 1% $PH_3$ gas diluted by a nitrogen gas having flow velocity of 10 sccm, and maintaining this at about 530 degrees C. under 1 Torr of pressure, by this condition the amorphous silicon film having a phosphorous concentration of about $5 \times 10^{19}$ (atoms/cm$^2$). The preferred thickness of layer 34 of A—Si is between about 500 to 1,000 Angstrom.

Following, FIG. 2c, a second layer 36 of A—Si is deposited, to a thickness between about 500 and 1,000 Angstrom, over the layer 32 of TiN that has previously been deposited over the first surface 33 of the substrate 30. The same processing conditions can be applied for the creation of second layer 36 of A—Si as has previously been cited for the creation of the first layer 34 of A—Si, FIG. 2b.

Figure 2D:
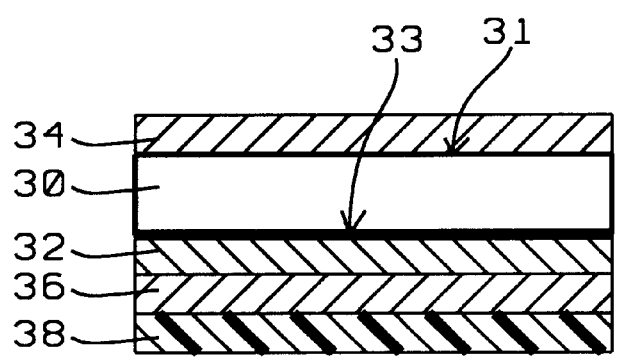
Figure 2E:
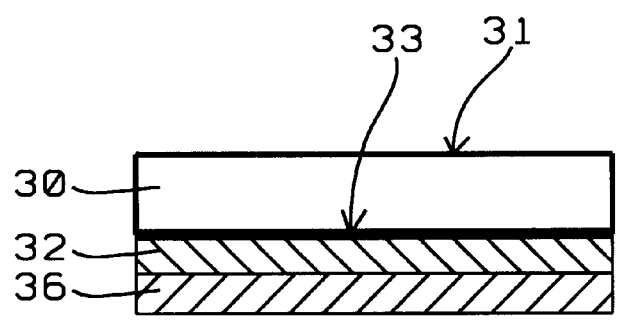

The second layer 36 of A—Si is now protected with a layer 38 of photoresist deposited over the surface of the second layer 36 of A—Si, see FIG. 2d, which allows for the removal of the first layer 34 of A—Si from the second surface 31 of the substrate 30. The protective layer 38 of photoresist is shown in the cross section of FIG. 2d, overlying the surface of layer 36 of A—Si. Layer 38 of photoresist is preferably created to a thickness between about 3,000 and 7,000 Angstrom, using conventional methods of photoresist coating.

After the first layer 34 of A—Si has been removed from the second surface 31 of glass panel 30, the removal of layer 38 of photoresist completes the first embodiment of the invention. Overlying the first surface 33 of glass substrate 30 are a layer 32, FIG. 2e, of TiN over which a layer 36 of A—Si has been deposited.

Figure 3A:
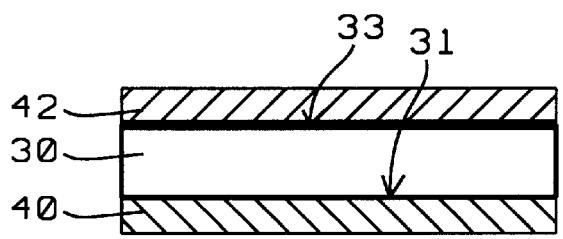
FIGS. 3a through 3d highlight the second embodiment of the invention, as follows.

The second embodiment of the invention will be now highlighted using FIGS. 3a through 2c.

Referring specifically to the cross section that is shown in FIG. 3a, a cross section of a substrate 30 is shown, a first layer 42 of TiN and a second layer 40 of TiN have been deposited over respectively the first surface 33 and the second surface 31 of the substrate 30.

Layers 40 and 42 of TiN can preferably be deposited using sputtering, to a thickness between about 500 to 1,000 Angstrom. Layers 40 and 42 can also be deposited using methods of CVD.

Figure 3B:
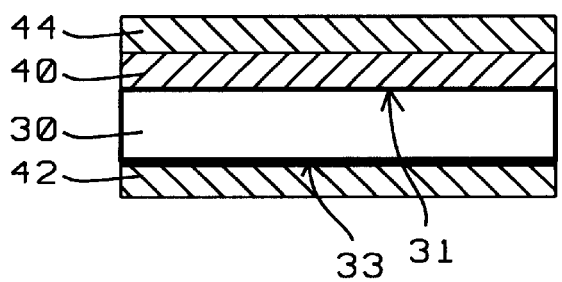

Next, in the cross section of FIG. 3b, a layer 44 of A—Si is blanket deposited over the surface of the layer 40 that has previously been deposited over the second surface 31 of the substrate 30.

The amorphous silicon film 44 can be formed by introducing a 100% $SiH_4$ gas having a flow rate of 1000 sccm and 1% $PH_3$ gas diluted by a nitrogen gas having flow velocity of 10 sccm, and maintaining this at about 530 degrees C. under 1 Torr of pressure, by this condition the amorphous silicon film having a phosphorous concentration of about $5 \times 10^{19}$ (atoms/cm$^2$). The preferred thickness of layer 34 of A—Si is between about 500 to 1,000 Angstrom.

The layer 44 of A—Si is now protected with a layer 46 of photoresist deposited over the surface of the layer 44 of FIG. 3b, which allows for the removal of the first layer 42 of TiN from the first surface 33 of the substrate 30. The protective layer 46 of photoresist is shown in the cross section of FIG. 3c, overlying the surface of layer 44 of A—Si.

Figure 3C:
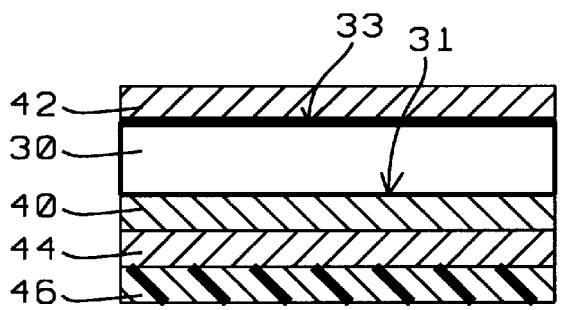
Figure 3D:
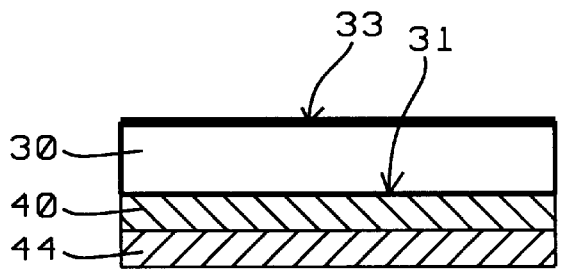

After layer 42, FIG. 3c, has been removed, the removal of layer 46 of photoresist completes the second embodiment of the invention with the creation of a second layer 40, FIG. 3d, of TiN over which a layer 44 of A—Si is created, both layers overlying the second surface 31 of the substrate 30.

From the above two embodiments of the invention, it is clear that the invention has provided a protective layer over a surface of a substrate, whereby the exposed surface of the protective layer is A—Si, eliminating the previously experienced problems of contamination caused by an exposed surface of a protective layer of TiN. This removes the need for extensive removal of TiN contamination in processing tools that are used for the completion of a semiconductor package of which the substrate form an integral part.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A method for the prevention of backside material contamination, comprising the steps of:
   providing a substrate, said substrate having a first and a second surface;
   depositing a layer of backside material over the first surface of said substrate;
   depositing a first layer of amorphous silicon (A—Si) over the second surface of said substrate;
   depositing a second of layer of amorphous silicon (A—Si) over the surface of said layer of backside material;
   depositing a layer photoresist over the surface of said second layer of amorphous silicon (A—Si);
   removing said layer of photoresist from the surface of said second layer of amorphous silicon (A—Si); and
   removing said first layer of amorphous silicon (A—Si) from the second surface of said substrate.

2. The method of claim 1, said backside material being selected from the group consisting of titanium nitride and silicon and silicon oxide and tungsten and silicon nitride.

3. The method of claim 1, said substrate comprising a glass panel.

4. The method of claim 1, said layer of backside material being deposited to a thickness between about 500 and 1,000 Angstrom.

5. The method of claim 1, said first layer of A—Si being deposited to a thickness between about 500 and 1,000 Angstrom.

6. The method of claim 1, said second layer of A—Si being deposited to a thickness between about 500 and 1,000 Angstrom.

7. The method of claim 1, said layer of photoresist being coated to a thickness between about 3,000 and 7,000 Angstrom.

8. A method for the prevention of backside titanium nitride (TiN) contamination, comprising the steps of:
   providing a substrate, said substrate having a first and a second surface, a protective coating is to be formed over the second surface of said substrate;
   depositing a first layer of titanium nitride (TiN) over the first surface of said substrate;
   depositing a second layer of titanium nitride (TiN) over the second surface of said substrate;
   depositing a layer of amorphous silicon (A—Si) over the surface of said second layer of TiN;
   depositing a layer photoresist over the surface of said layer of amorphous silicon (A—Si);
   removing said first layer of TiN from the first surface of said substrate; and
   removing said layer of photoresist from the surface of said layer of amorphous silicon (A—Si).

9. The method of claim 8, said substrate comprising a glass panel.

10. The method of claim 8, said first layer of TiN being deposited to a thickness between about 500 and 1,000 Angstrom.

11. The method of claim 8, said second layer of TiN being deposited to a thickness between about 500 and 1,000 Angstrom.

12. The method of claim 8, said layer of A—Si being deposited to a thickness between about 500 and 1,000 Angstrom.

13. The method of claim 8, said layer of photoresist being coated to a thickness between about 3,000 and 7,000 Angstrom.

14. The method of claim 1, said backside material comprising TiN.

* * * * *